United States Patent
Ellmann

(10) Patent No.: US 9,592,865 B2
(45) Date of Patent: Mar. 14, 2017

(54) TRACK ASSEMBLY HAVING DUAL-SPROCKET DRIVE WHEEL

(71) Applicant: Caterpillar Inc., Peoria, IL (US)

(72) Inventor: Thomas Ellmann, Creve Coeur, IL (US)

(73) Assignee: Caterpillar Inc., Peoria, IL (US)

( * ) Notice: Subject to any disclaimer, the term of this patent is extended or adjusted under 35 U.S.C. 154(b) by 264 days.

(21) Appl. No.: 14/465,181

(22) Filed: Aug. 21, 2014

(65) Prior Publication Data

US 2016/0052570 A1 Feb. 25, 2016

(51) Int. Cl.
*B62D 55/12* (2006.01)
*B62D 55/14* (2006.01)
*B62D 55/21* (2006.01)
*B62D 55/30* (2006.01)
*B62D 55/125* (2006.01)

(52) U.S. Cl.
CPC ........... *B62D 55/12* (2013.01); *B62D 55/125* (2013.01); *B62D 55/14* (2013.01); *B62D 55/211* (2013.01); *B62D 55/30* (2013.01)

(58) Field of Classification Search
CPC ........ B62D 55/12; B62D 55/30; B62D 55/14; B62D 55/125; B62D 55/211
USPC ....... 305/125, 142, 143, 144, 145, 146, 149, 305/153, 155; 180/9.54
See application file for complete search history.

(56) References Cited

U.S. PATENT DOCUMENTS

| | | | |
|---|---|---|---|
| 1,341,761 A | 6/1920 | Putnam et al. | |
| 3,916,708 A | 11/1975 | Durand | |
| 3,948,572 A | 4/1976 | Korner et al. | |
| 4,278,301 A | 7/1981 | Gregor et al. | |
| 4,602,825 A * | 7/1986 | Meisel, Jr. ........... | B62D 55/286 305/100 |
| 5,096,270 A * | 3/1992 | Oilund ............... | B62D 55/0845 180/6.7 |
| 7,296,862 B2 * | 11/2007 | Albright ............... | B62D 55/12 305/143 |

(Continued)

FOREIGN PATENT DOCUMENTS

| | | |
|---|---|---|
| EP | 2327610 | 6/2011 |
| EP | 2636579 | 9/2013 |

OTHER PUBLICATIONS

U.S. Patent Application to Ellmann entitled "Track Assembly Having Arcuate Crawler Shoes" filed on Aug. 21, 2014.

*Primary Examiner* — S. Joseph Morano
*Assistant Examiner* — Jean Charleston
(74) *Attorney, Agent, or Firm* — Finnegan, Henderson, Farabow, Garrett & Dunner, LLP

(57) ABSTRACT

A track assembly is disclosed for use with a mobile machine. The track assembly may have a plurality of crawler shoes. Each of the plurality of crawler shoes may include a ground engaging surface and first and second pairs of links laterally spaced apart on a side opposite the ground engaging surface. The track assembly may also have a first pin connecting the first pair of links of each of the plurality of crawler shoes to form a first continuous chain, and a second pin connecting the second pair of links of each of the plurality of crawler shoes to form a second continuous chain. The track assembly may further have a drive wheel having dual sprockets configured to simultaneously engage the first and second continuous chains.

7 Claims, 4 Drawing Sheets

(56) References Cited

U.S. PATENT DOCUMENTS

| | | | |
|---|---|---|---|
| 7,806,209 B2 * | 10/2010 | Standish | B62D 55/096 180/9.1 |
| 7,914,087 B2 * | 3/2011 | Alfthan | B62D 55/305 305/125 |
| 8,070,240 B2 | 12/2011 | Zheng et al. | |
| 8,070,241 B2 | 12/2011 | Mulligan | |
| 8,528,671 B2 * | 9/2013 | Beasley | B62D 55/305 180/9.1 |
| 2013/0342006 A1 | 12/2013 | Kunigk | |

* cited by examiner

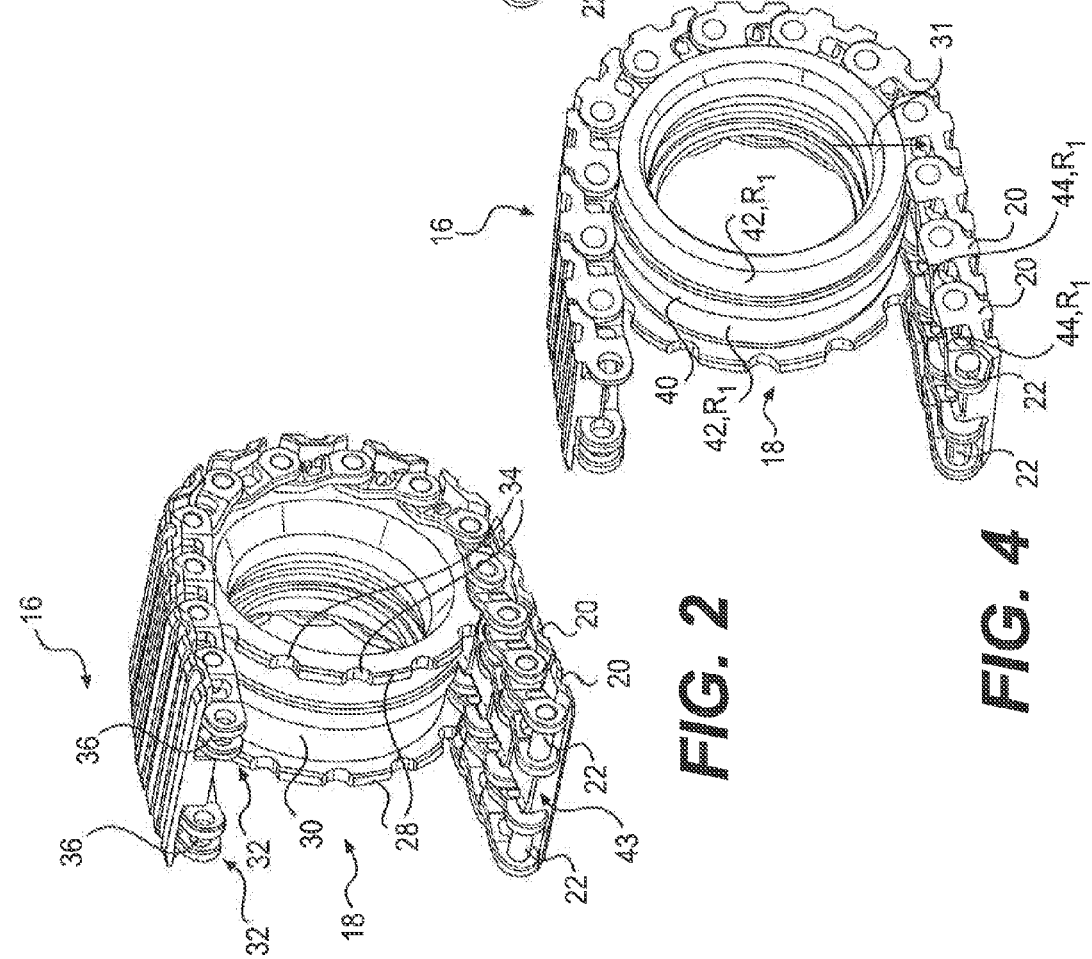

TRACK ASSEMBLY HAVING DUAL-SPROCKET DRIVE WHEEL

TECHNICAL FIELD

The present disclosure relates generally to a track assembly and, more particularly, to a track assembly having a dual-sprocket drive wheel.

BACKGROUND

A track-type mobile machine utilizes tracks located at either side of the machine to propel the machine. The tracks each include a chain having links pinned end-to-end to form a loop that extends around a drive sprocket and one or more idler wheels, and ground engaging pads connected to each pair of links in the chain. A ground engaging pad, together with a pair of links, is commonly referred to as a crawler shoe. In some embodiments, the crawler shoe is a single cast and/or forged component. Two sprockets are driven by an engine of the machine to rotate the chains of the two tracks and push the ground engaging pads against a work surface, thereby transmitting torque from the engine to the surface in opposition to a desired travel direction of the machine.

In a machine having new tracks, only a single tooth of each sprocket engages its corresponding track at any given time. This is because of spatial requirements that allow lugs of the different crawler shoes to fall between adjacent teeth of the sprocket without interference. Over time, as the tracks wear, more teeth of the sprocket engage the crawler shoe lugs until an interference occurs. When this happens, either the tracks must be replaced or larger sprockets must be installed, both of which are resource-consuming activities. Because only a single tooth of each sprocket engages the corresponding track when the track is new, excessive force can be transmitted through the single tooth into the connected crawler shoe. This excessive force can cause the sprocket and track to wear prematurely and/or to fail completely.

An alternative track arrangement is disclosed in U.S. Pat. No. 8,070,241 of Mulligan that issued on Dec. 6, 2001 ("the '241 patent"). Specifically, the '241 patent discloses an undercarriage for a work vehicle. The undercarriage includes a left-track assembly and a right-track assembly. Each of the left- and right-track assemblies has a rear dual-sprocket drive wheel that is rotatably attached to a frame of the vehicle, a font idler, upper and lower rollers, and a track trained about the drive wheel, the idler, and the rollers. The track includes a chain, and multiple ground-engaging shoes attached to the chain via bolts. Links of the chain are pivotally connected to each other by way of pins, and drive caps are mounted to opposing ends of each pin outboard of the chain links. Teeth of the dual-sprocket drive wheel engage the drive caps, thereby transmitting tractive forces through the chain to the shoes.

While the dual-sprocket arrangement of the '241 patent may be an improvement over a single-sprocket arrangement, the arrangement of the '241 patent may lack broad applicability. In particular, the dual-sprocket arrangement of the '241 patent may not be applicable to machines having integral cast or forged crawler shoes. In addition, because the teeth of the dual-sprocket drive wheel engage the drive caps at cantilevered ends of the pins and because the arrangement uses only a single chain per track assembly, the arrangement of the '241 patent may not be durable enough for large machine applications where high tractive forces are transmitted through the pins and the chain.

The disclosed track assembly is directed to overcoming one or more of the problems set forth above.

SUMMARY

In one aspect, the present disclosure is related to a track assembly for a mobile machine. The track assembly may include a plurality of crawler shoes. Each of the plurality of crawler shoes may have a ground engaging surface and first and second pairs of links laterally spaced-apart on a side opposite the ground engaging surface. The track assembly may also include a first pin connecting the first pair of links of each of the plurality of crawler shoes to form a first continuous chain, and a second pin connecting the second pair of links of each of the plurality of crawler shoes to form a second continuous chain. The track assembly may further include a drive wheel having dual sprockets configured to simultaneously engage the first and second continuous chains.

In another aspect, the present disclosure is related to another track assembly for a mobile machine. This track assembly may include a plurality of crawler shoes, each having a ground engaging surface and first and second integral pairs of links laterally spaced-apart on a side opposite the ground engaging surface to form two separate chains. The track assembly may also include a plurality of pins connecting the two separate chains of each of the plurality of crawler shoes to the two separate chains of adjacent ones of the plurality of crawler shoes to form an endless loop. The track assembly may further include a drive wheel having dual sprockets configured to extend into a space between the links of a corresponding one of the first and second integral pairs to engage the plurality of pins, and a hub connecting the dual sprockets. The hub may be configured to exert bearing forces on first wear surfaces of the first and second integral pairs of links. The track assembly may additionally have an idler wheel located at an end of the track assembly opposite the drive wheel, a plurality of rollers disposed between the drive wheel and the idler wheel, and a tensioner configured to push the idler wheel away from the drive wheel. The plurality of rollers may be configured to engage a second wear surface of each of the plurality of crawler shoes different than the first wear surfaces engaged by the hub of the drive wheel and by the idler wheel.

In yet another aspect, the present disclosure is related to another track assembly for a mobile machine. This track assembly may include a plurality of crawler shoes, each having a ground engaging surface and first and second integral pairs of links laterally spaced-apart on a side opposite the ground engaging surface to form two separate chains. The track assembly may also include a plurality of pins connecting the two separate chains of each of the plurality of crawler shoes to the two separate chains of adjacent ones of the plurality of crawler shoes to form an endless loop. The track assembly may further include a drive wheel having dual sprockets configured to extend into a space between the links of a corresponding one of the first and second integral pairs to engage the plurality of pins, and a hub connecting the dual sprockets. The hub may be configured to exert bearing forces on first wear surfaces of the first and second integral pairs of links. The track assembly may additionally have an idler wheel located at an end of the track assembly opposite the drive wheel, a plurality of rollers disposed between the drive wheel and the idler wheel, and a tensioner configured to push the idler wheel away from the drive wheel. The plurality of rollers may be configured to engage a second wear surface of each of the plurality of crawler shoes different than the first wear surfaces engaged by the hub of the drive wheel and by the idler wheel. Each of the dual sprockets may include openings configured to receive the plurality of pins, and a pitch spacing between adjacent ones of the openings may be about equal to a longitudinal distance between adjacent ones of the plurality of pins. Each of the dual sprockets may be configured to extend into a space between links of a corresponding one of the first and second integral pairs to engage the plurality of pins, and the hub may include an annular protrusion configured to extend into a space between the first and second integral pairs of links.

BRIEF DESCRIPTION OF THE DRAWINGS

FIGS. 2-4 are isometric illustrations of an exemplary disclosed track assembly that may be used in conjunction with the mobile machine of FIG. 1.

DETAILED DESCRIPTION

Figure 1:
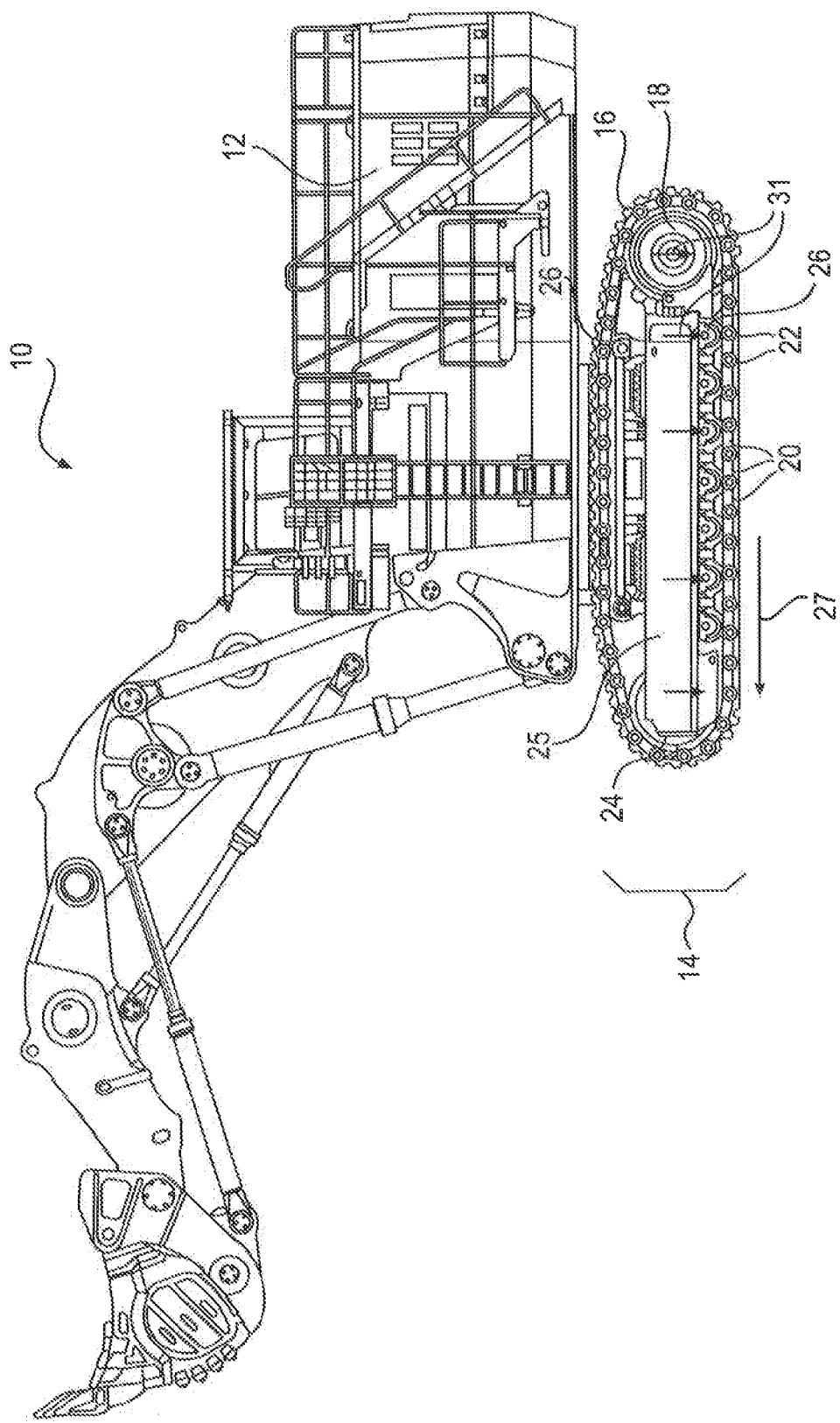
FIG. 1 is a side-view illustration of an exemplary disclosed mobile machine.

FIG. 1 illustrates a track type mobile machine 10 having an engine 12 supported by a frame and configured to drive a tracked undercarriage 14. Mobile machine 10 may be any machine that performs an operation associated with an industry such as mining, construction, farming, or another industry known in the art. For example, machine 10 may be a material moving machine such as a front shovel, a rope shovel, a hydraulic excavator, a dozer, a loader, or another material moving machine.

Undercarriage 14 may include parallel track assemblies 16 that are located at opposing sides of machine 10 and driven by engine 12 via corresponding drive wheels 18 (only one track assembly 16 and one drive wheel 18 are shown in FIG. 1). Each track assembly 16 may include a plurality of crawler shoes 20 connected end-to-end via pins 22 to form an endless loop. The endless loop of crawler shoes may be wrapped around corresponding drive wheels 18, one or more idler wheels 24, and at least one roller 26. Drive wheels 18 may engage pins 22 (or engage bushings that encase pins 22) of crawler shoes 20 and thereby transmit torque from engine 12 to track assemblies 16. Idler wheel 24 and rollers 26 may guide track assemblies 16 in a general elliptical trajectory around drive wheels 18. A tensioner 25 may be located between idler wheel 24 and drive wheel 18 to push these components apart and thereby maintain a desired tension of track assembly 16. Crawler shoes 20 may function to transmit the torque from drive wheels 18 as a driving linear (tractive) force 27 into a ground surface. The weight of machine 10 may be transmitted from drive wheel 18, idler wheel 24, and rollers 26 through crawler shoes 20 as a bearing force 31 into the ground surface.

As shown in FIG. 2, each drive wheel 18 may include multiple (e.g., dual) sprockets 28 connected to each other by way of a hub 30. Sprocket 28 may be configured to separately engage a corresponding continuous chain 32 formed by crawler shoes 20 and thereby propel machine 10. Chains 32 may be located apart from each other at lateral edges of crawler shoes 20, and sprockets 28 may extend into longitudinal spaces 36 with each chain 32. A plurality of openings or pockets 34 formed around a periphery of each sprocket 28 may be configured to receive pins 22 of track assembly 16.

FIG. 3, an outside portion of track assembly 16 has been removed to illustrate a unique relationship between sprocket 28 and pins 22. As can be seen in this figure, pockets 34 may be elongated (i.e., have a width greater than a height) and configured to simultaneously engage and exert torque on all pins 22 that are received therein. That is, instead of a single tooth of a conventional drive wheel engaging a single conventional crawler shoe lug at a given time, sixteen different pins 22 are shown as being simultaneously engaged by the disclosed drive wheel 18. This may allow for an increased amount of torque to be transmitted through sprocket 2$ to track assembly 16 and/or an increased component life of undercarriage 14. It should be noted that a different number of pins 22 may be simultaneously engaged by drive wheel 18, depending on the particular application.

A height H of each sprocket pocket 34 may be about equal to a radius of pin 22, and a pitch spacing S between adjacent pockets 34 may be about equal to a longitudinal distance D between pins 22. With this configuration, the tractive forces 27 transmitted from sprockets 28 to track assemblies 16 may be transmitted through a center of pins 22, and no empty pockets 34 may exist between engaged pins 22. This may allow for a greater amount of material to exist at the periphery of sprocket 28, and a corresponding greater strength of sprocket 28.

When pins 22 are engaged with pockets 34 of sprocket 28, a radial clearance 38 may exist between sprocket 28 and crawler shoes 20. In particular, the outer periphery of sprocket 28 may not ride directly on crawler shoes 20. With this configuration, the only forces being transmitted through sprocket 28 may be the forces passing into pins 22. And these forces may primarily be tractive forces 27. In other words, little or no bearing forces 31 may be transmitted from sprocket 28 into pins 22. This may result in an overall reduction in forces experienced by pins 22 and a corresponding increase in the life of pins 22.

In FIG. 4, a greater amount of track assembly 16 has been removed to illustrate a unique relationship between crawler shoes 20 and hub 30 of drive wheel 18. As can be seen in this figure, the bearing forces 31 of machine 10 may primarily be supported by hub 30 on crawler shoes 20. Specifically, hub 30 may be generally cylindrical, having a center portion or rib 40 and opposing end portions or running surfaces 42 located axially outboard of center rib 40. And running surfaces 42 of hub 30 may be configured to ride directly on chains 32, thereby bypassing pins 22 and transmitting the bearing forces 31 of machine 10 directly onto crawler shoes 20. Center rib 40 may protrude radially outward a distance past running surfaces 42 and into a space 43 between chains 32. In this manner, center rib 40 (in addition to the location of sprockets 28 inside chains 32) may function to guide chains 32 (and thereby also track assembly 16) around drive wheel 18 (e.g., by periodically engaging and/or sliding against inboard surfaces of chains 32). Center rib 40 may not ride on crawler shoes 20 or transfer bearing forces 31 thereto.

As also shown in FIG. 4, each link of chains 32 may have an arcuate wear surface 44 with a radius $R_1$ generally matching a radius of hub 30 at running surfaces 42. In particular, when track assembly 16 is wrapped around drive wheel 18, the inside of chains 32 at wear surfaces 44 may form a substantially continuous round annulas that matches an outer curvature of hub 30 (and also of idler wheel 24—referring to FIG. 1). In the disclosed embodiment, $R_1$ may be about 800-825 mm. This curvature match may provide improved bearing force support, while also reducing sliding of chains 32 on hub 30 and idler wheel 24. The reduction in sliding may cause less wear of hub 30, allowing hub 30 to maintain a desired roundness that reduces machine vibration and improves operator comfort.

Figure 5:
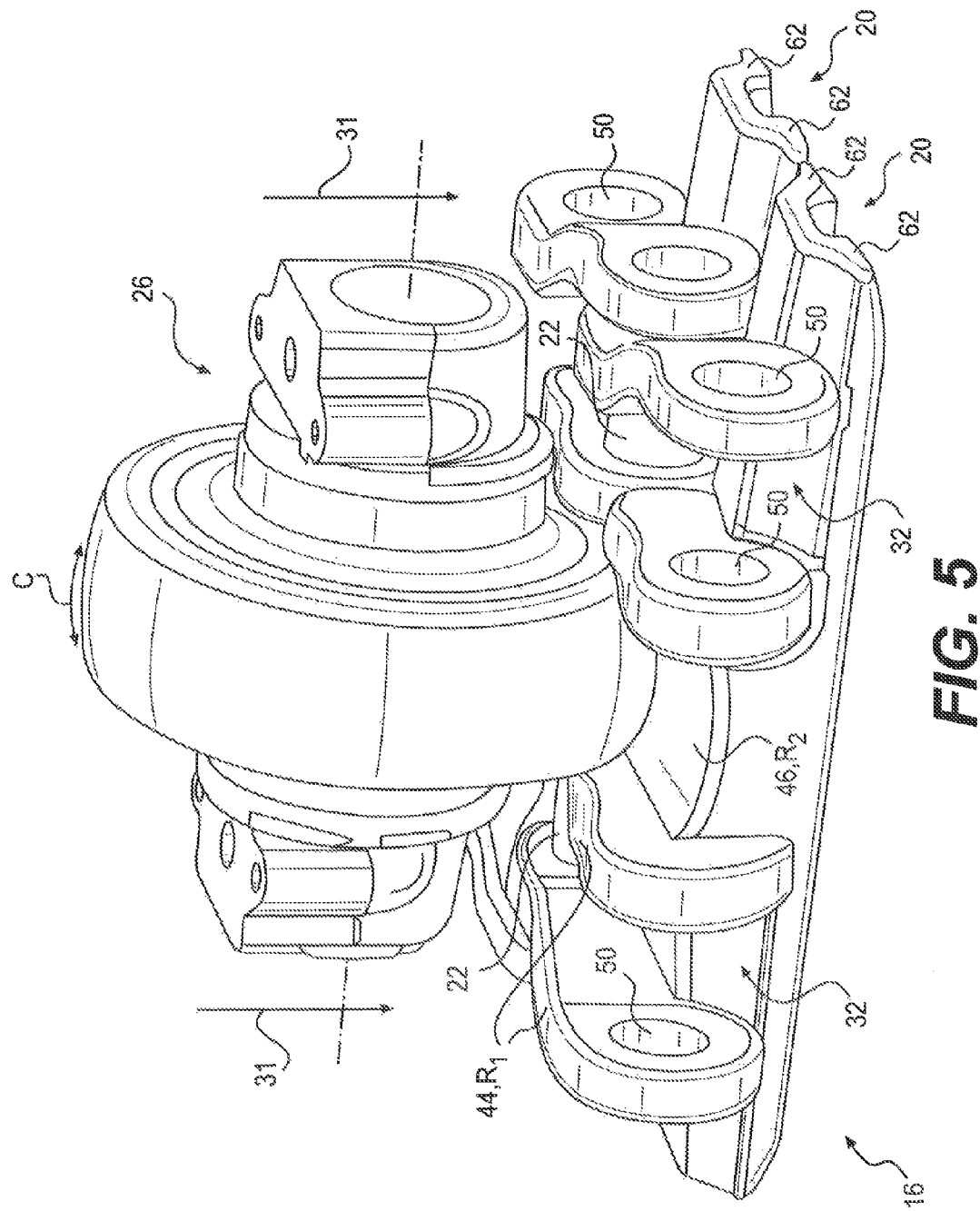
FIGS. 5-7 are isometric, plan-, and front-view illustrations of an exemplary disclosed crawler shoe that forms a portion of the track assembly of FIGS. 2-4.

FIG. 5 illustrates a unique relationship between rollers 26 and track assembly 16. In addition to the bearing forces 31 of machine 10 passing through hub 30 and idler wheel 24 to crawler shoes 20, bearing forces 31 may also pass through rollers 26 to crawler shoes 20. In particular, rollers 26 may be configured to ride on a wear surface 46 that is located laterally between chains 32. As will be described in more detail below, wear surfaces 46 of all crawler shoes 20 within a particular track assembly 16 may form a substantially continuous smooth surface (i.e., a surface not having conventional lugs) upon which rollers 26 may ride. Rollers 26, like center rib 40 of hub 30, may also be configured to engage and/or slide against the inboard sides of chains 32, thereby helping to guide track assembly 16 in a desired trajectory around idler wheel 24 and drive wheel 18.

In some embodiments, roller 26 may have a transverse curvature C (i.e., a curvature in a direction aligned with a rotational axis of roller 26). In these embodiments, wear surface 46 may also be transversely curved to generally match the curvature of roller 26. For example, wear surface 46 may have a curvature $R_2$. In the disclosed embodiment, $R_2$ may be about $0.6\text{-}0.625 \times R_1$ (e.g., about equal to 500 mm). This curvature relationship may allow for a desired ratio of the bearing forces to be transmitted through idler wheel 24, rollers 26, and hub 30 of drive wheel 18.

Figure 6:
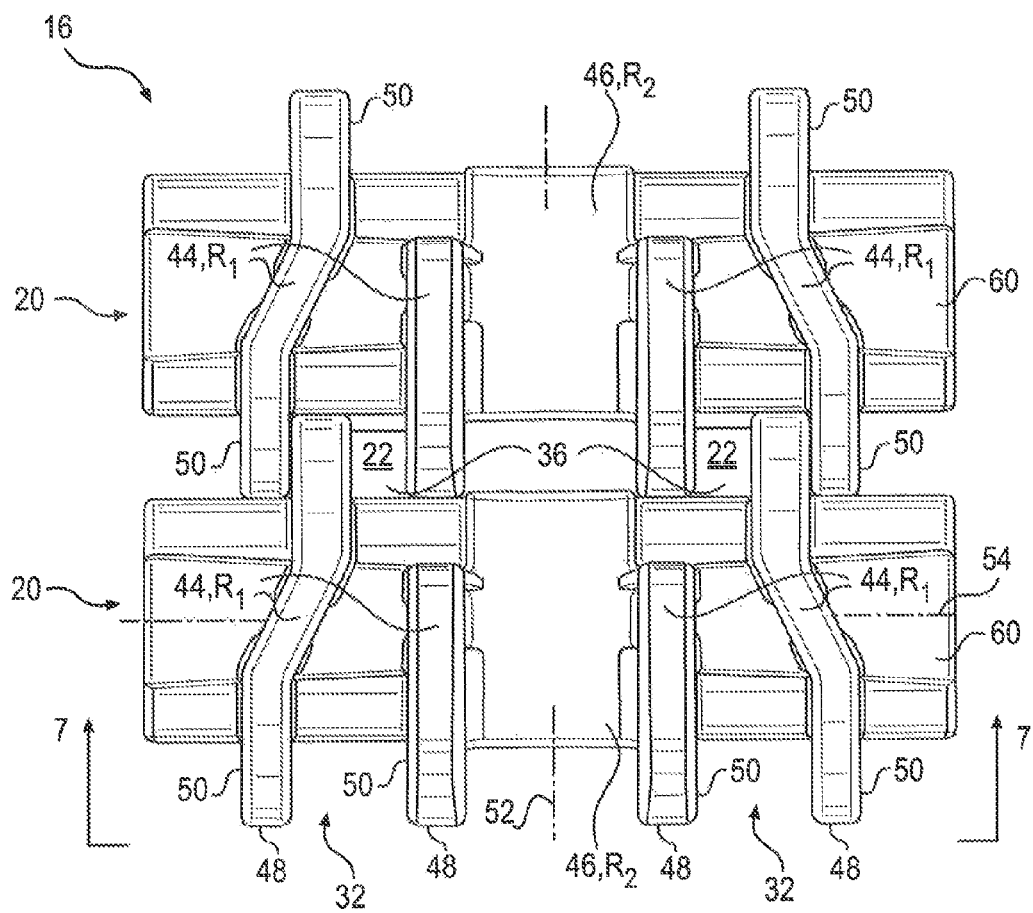
Figure 7:
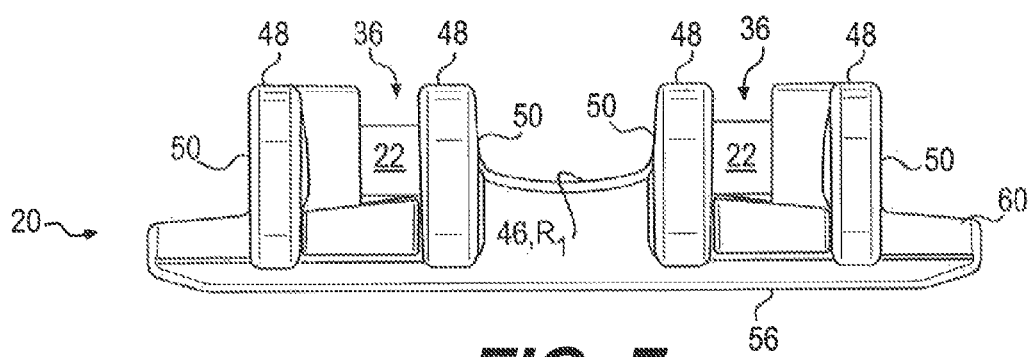

As shown in the plan and front views of FIGS. 6 and 7, each crawler shoe 20 may include two pairs of spaced-apart links 48 that are generally parallel with each other. Each link 48 may extend in a length direction of the associated chain 32, and include at least one pin bore 50 formed at an end thereof. In the embodiment of FIGS. 5-7, an inside link 48 of each pair includes only a single pin bore 50 located at a leading end, while the paired outside link 48 includes two pin bores 50 (one located at each end). In this configuration, a trailing end of only the outside link 48 is configured to pass between paired links 48 at the leading end of an adjacent crawler shoe 20, such that three corresponding pin bores 50 align. Pins 22 may then pass through the three aligned bores 50, thereby joining the adjacent crawler shoes 20. It is contemplated, however, that both links 48 (i.e., the inside link 48 and the outside link 48) of each pair could have two pin bores 50 (shown in embodiment of FIGS. 2-4) and/or that that the trailing ends of both links 48 could connect with two corresponding links 48 of an adjacent crawler shoe 20 (i.e., that four pin bores 50 would align and be connected by a single pin 22), if desired. Other configurations may also be possible.

Each link 48 may include wear surface 44 configured to engage sprocket 28 and idler wheel 24. Wear surface 44 may be located at an edge opposite a ground engaging surface 56 of crawler shoe 20. The outer links 48 of each pair may have a transverse zigzag shape, while the inner links 48 may be generally planar. Other shapes may also be possible. Wear surfaces 44 of all links 48 within a single crawler shoe 20 may be generally aligned with each other (e.g., have a common axis 54).

A ground engaging pad 60 may be connected to links 48 opposite wear surface 44, to thereby rigidly connect links 48 to each other. Wear surface 46 may be formed within ground engaging pad 60 at a location between the pairs of links 48 (i.e., between chains 32). Specifically, wear surfaces 46 may be transversely centered within each crawler shoe 20, extend in the length direction about the same amount as ground engaging surface 56, and extend in the width direction from one pair of links 48 to the other pair of links. Wear surface 46 may be generally flat or straight in the length direction of track assembly 16, and be curved only around an axis 52 that is generally perpendicular to axis 54.

In the disclosed embodiment, ground engaging pad 60 and links 48 are integrally formed as a single cast and/or forged component. It is contemplated, however, that ground engaging pad 60 could initially be formed separately from links 48 and subsequently joined to links 48 via welding and/or threaded fastening, if desired. Ground engaging pad 60 may have any external geometry known in the art. For example, ground engaging pad 60 may be generally plate-like, include transverse ridges or grousers 62 (shown only in FIG. 5), have openings, and/or include any other features common in the art.

INDUSTRIAL APPLICABILITY

The track assembly of the present disclosure may be applicable to any track-type mobile machine. However, the disclosed track assembly may be particularly applicable to larger machines, in which the forces passing through the track assembly are significant and can affect longevity of the track assembly. This may be particularly important for expensive machines that operate around the clock, where downtime of the machine is costly to the owner.

The disclosed track assembly may have improved component longevity. Specifically, because bearing forces of the associated machine may pass primarily through a drive wheel hub to crawler shoes of the track assembly without passing through sprocket teeth or pins, the sprocket teeth and pins may experience less stress. And the reduction in stress may result in a longer life of these components. In addition, because the disclosed track assembly may utilize a dual-sprocket drive wheel, the tractive forces per tooth and per pin may be further reduced. Further, a strength of each sprocket may be increased through the use of additional material at a periphery thereof. And finally, because each sprocket may engage a center of each pin and because each pin may be supported at both ends, the bending moments acting on the pins may be lower.

The disclosed track assembly may also provide for enhanced machine operation. In particular, because the hub of the drive wheel may ride directly on curved wear surfaces of the track assembly links, the bearing forces of the machine may be more evenly distributed across the hub and the crawler shoes. In addition, the curved nature of the link wear surfaces may result in less sliding, which may help to maintain a roundness of the hub. And the roundness of the hub, in combination with improved force distribution, may result in lower track-induced vibration levels.

It will be apparent to those skilled in the art that various modifications and variations can be made to the disclosed track assembly. Other embodiments will be apparent to those skilled in the art from consideration of the specification and practice of the disclosed track assembly. It is intended that the specification and examples be considered as exemplary only, with a true scope being indicated by the following claims and their equivalents.

What is claimed is:

1. A track assembly for a mobile machine, comprising:
   a plurality of crawler shoes, each having a ground engaging surface and first and second integral pairs of links laterally spaced-apart on a side opposite the ground engaging surface to form two separate chains;
   a plurality of pins connecting the two separate chains of each of the plurality of crawler shoes to the two separate chains of adjacent ones of the plurality of crawler shoes to form an endless loop;

a drive wheel having dual sprockets configured to extend into a space between links of a corresponding one of the first and second integral pairs of links to engage the plurality of pins, and a hub connecting the dual sprockets, wherein the hub is configured to exert bearing forces on first wear surfaces of the first and second integral pairs of links;

an idler wheel located at an end of the track assembly opposite the drive wheel and configured to engage the first wear surfaces;

a plurality of rollers disposed between the drive wheel and the idler wheel, wherein the plurality of rollers are configured to engage a second wear surface of each of the plurality of crawler shoes different than the first wear surfaces engaged by the hub of the drive wheel and by the idler wheel; and a tensioner configured to push the idler wheel away from the drive wheel.

2. The track assembly of claim 1, wherein:

each of the dual sprockets includes openings configured to receive the plurality of pins; and a pitch spacing between adjacent ones of the openings is about equal to a longitudinal distance between adjacent ones of the plurality of pins.

3. The track assembly of claim 1, wherein each of the dual sprockets is configured to extend into a space between links of a corresponding one of the first and second integral pairs to engage the plurality of pins.

4. The track assembly of claim 1, wherein the hub includes an annular protrusion configured to extend into a space between the first and second integral pairs of links.

5. The track assembly of claim 1, wherein the second wear surfaces of all of the plurality of crawler shoes form a substantially smooth continuous surface within the endless loop.

6. A track assembly for a mobile machine, comprising:

a plurality of crawler shoes, each having a ground engaging surface and first and second integral pairs of links laterally spaced-apart on a side opposite the ground engaging surface to form two separate chains;

a plurality of pins connecting the two separate chains of each of the plurality of crawler shoes to the two separate chains of adjacent ones of the plurality of crawler shoes to form an endless loop;

a drive wheel having dual sprockets configured to extend into a space between links of a corresponding one of the first and second integral pairs of links to engage the plurality of pins, and a hub connecting the dual sprockets, wherein the hub is configured to exert bearing forces on first wear surfaces of the first and second integral pairs of links;

an idler wheel located at an end of the track assembly opposite the drive wheel and configured to engage the first wear surfaces;

a plurality of rollers disposed between the drive wheel and the idler wheel, wherein the plurality of rollers are configured to engage a second wear surface of each of the plurality of crawler shoes different than the first wear surfaces engaged by the hub of the drive wheel and by the idler wheel; and a tensioner configured to push the idler wheel away from the drive wheel, wherein:

each of the dual sprockets includes openings configured to receive the plurality of pins;

a pitch spacing between adjacent ones of the openings is about equal to a longitudinal distance between adjacent ones of the plurality of pins;

each of the dual sprockets is configured to extend into a space between links of a corresponding one of the first and second integral pairs to engage the plurality of pins; and the hub includes an annular protrusion configured to extend into a space between the first and second integral pairs of links.

7. The track assembly of claim 6, wherein the second wear surfaces of all of the plurality of crawler shoes form a substantially smooth continuous surface within the endless loop.

\* \* \* \* \*